(12) United States Patent
Cook

(10) Patent No.: US 11,958,507 B2
(45) Date of Patent: Apr. 16, 2024

(54) SOLAR-ASSISTED RAILROAD-BASED WIND FARM

(71) Applicant: Kevin William Cook, Eugene, OR (US)

(72) Inventor: Kevin William Cook, Eugene, OR (US)

(73) Assignee: Railroad Windfarm, LLC

( * ) Notice: Subject to any disclaimer, the term of this patent is extended or adjusted under 35 U.S.C. 154(b) by 451 days.

(21) Appl. No.: 17/090,849

(22) Filed: Nov. 5, 2020

(65) Prior Publication Data

US 2021/0129873 A1  May 6, 2021

Related U.S. Application Data

(60) Provisional application No. 62/931,644, filed on Nov. 6, 2019.

(51) Int. Cl.
*B61C 7/04* (2006.01)
*B61C 3/02* (2006.01)
(Continued)

(52) U.S. Cl.
CPC ............. *B61C 7/04* (2013.01); *B61C 3/02* (2013.01); *B61C 17/06* (2013.01); *B61H 9/06* (2013.01);
(Continued)

(58) Field of Classification Search
CPC .. B61C 7/04; B61C 3/02; B61C 17/06; B61H 9/06; F03D 9/007; F03D 9/11; F03D 9/32; H02S 10/12; H02S 10/20; H02S 10/40; H02S 20/30; F05B 2220/708; F05B 2240/211; F05B 2240/941; B60T 1/10; B60T 13/586; B60T 13/665; B61D 3/18; B61D 43/00; F16D 61/00; Y02E 10/50; Y02E 10/72; Y02E 10/728; Y02E 70/30; Y02P 80/20; Y02P 90/50; Y02T 30/00
See application file for complete search history.

(56) References Cited

U.S. PATENT DOCUMENTS 5,595,121 A * 1/1997 Elliott ...................... A63G 7/00
104/53
8,646,720 B2 * 2/2014 Shaw ...................... B64C 27/20
244/17.23
(Continued)

*Primary Examiner* — Michael C Zarroli

(57) ABSTRACT

Modifying railcar embodiments convert the dead weight of empty railcars to productive use. Battery embodiments are charged by regenerative brakes, solar panels, and wind turbines. Freight car wheels, have a plurality of regenerative brakes. A plurality of airfoils, with solar panels, are installed on shipping containers, to counteract drag created by a plurality of wind turbines. Railcar embodiments are used in a mix and match fashion, as desired. Storage battery banks, are shipped and/or charged to replace existing hazardous transmission lines. Storage battery banks, are shipped and/or charged to avoid constructing new transmission lines for solar or wind farms. Factory installed EV batteries, EV batteries, and/or other rechargeable batteries, are shipped and/or charged. After battery embodiment charging is complete, power generated is diverted to train engines. Provisions are made for embodiments not connected to train engines. Embodiment operations are monitored with data displays.

3 Claims, 8 Drawing Sheets

(51) Int. Cl.
*B61C 17/06* (2006.01)
*B61H 9/06* (2006.01)
*F03D 9/00* (2016.01)
*F03D 9/11* (2016.01)
*F03D 9/32* (2016.01)
*H02S 10/12* (2014.01)
*H02S 10/20* (2014.01)
*H02S 10/40* (2014.01)

(52) U.S. Cl.
CPC ............... *F03D 9/007* (2013.01); *F03D 9/11* (2016.05); *F03D 9/32* (2016.05); *H02S 10/12* (2014.12); *H02S 10/20* (2014.12); *H02S 10/40* (2014.12); *B60L 2200/26* (2013.01); *F05B 2220/708* (2013.01); *Y02T 10/70* (2013.01); *Y02T 30/00* (2013.01)

(56) References Cited

U.S. PATENT DOCUMENTS

| | | | |
|---|---|---|---|
| 2016/0167677 A1* | 6/2016 | Schaefer, Jr. | B61C 7/04 105/35 |
| 2018/0069416 A1* | 3/2018 | Brace | F03D 9/00 |
| 2018/0237035 A1* | 8/2018 | Duke | B61B 13/00 |

* cited by examiner

SOLAR-ASSISTED RAILROAD-BASED WIND FARM

CROSS REFERENCE TO RELATED APPLICATIONS

This application claims priority benefit of U.S. Provisional Application, Ser. No. 62/931,644, filed Nov. 6, 2019, by Kevin William Cook, which is incorporated herein by reference in its entirety.

TECHNICAL FIELD

This application relates to renewable energy, and more particularly to wind farms.

BACKGROUND

It is known in the prior art that renewable energies, and Electric Vehicles (EVs), presented as solutions to global warming have limitations. Conventional wind turbines have drawbacks including, not functioning without naturally occurring wind, a maximum wind speed of 55 mph, and ever-increasing turbine size making maintenance more difficult. Solar farms require large areas of land and only produce during daylight hours. Hybrid solar and wind farms are now considered optimal. Storage batteries are commonly used to even out transmissions to improve reliability. Even with storage batteries, transmission lines are often the biggest obstacle. Cost of environmental reviews, permitting, and legal challenges often thwart renewable energy projects. Issues associated with renewable energy transmission lines are complicated by existing utilities' transmission lines that often cause deadly wildfires. For consistent wind and to avoid transmission line issues many wind farms have resorted to remote locations at sea. Increased reliability is offset by increased difficulty of maintenance.

Electric Vehicles are touted as a means to reduce carbon emissions but have economic restrictions. The battery is the highest production cost for EV manufacturers. The faster EV batteries charge the more they cost. The current focus on developing faster charging batteries results in higher costing EVs. Many drivers are not homeowners, so they do not have a place to install a battery charger. Many drivers, homeowners or not, lack the financial ability to install a battery charger. The inconvenience of recharging EV batteries, combined with high cost of EVs, deters many drivers from owning EVs. In the US, EV battery exchange services are generally not available. To compensate EV battery charging stations have been built.

DETAILED DESCRIPTION OF DRAWINGS

Freight railcars modified to the principles of the invention are for use on existing railroad tracks anywhere in the world. Battery embodiments are charged with power generated by a combination of regenerative brakes, solar panels, and as the primary power source, a plurality of wind turbines. A new application of Vertical Axis Wind Turbines (VAWTs), on flatbed railcars harnesses wind generated by moving freight trains to create near constant power generation compared to stationary wind turbines. Embodiments primary function is charging and/or shipping batteries. One embodiment provides extra power to train engines to effectively put them in overdrive when batteries are charged. If the railroad wind farm is not connected to train engines, another embodiment ceases solar and wind power generation after charging of batteries and excess power generated from regenerative brakes dissipated as heat. One embodiment powers freight train engines using wind turbines and drag reducing airfoils without any battery embodiments.

Unlike typical Horizontal Axis Wind Turbines (HAWTs) that shut down at 55 mph, Patent EP2735733A4 shows VAWTs designed for typhoon winds up to 156 mph. Patents CN105673345A and CN101149045A show land-based power generation from intermittent train-supplied wind. A novel interpretation of the patents cited with alternative applications of regenerative brakes, solar panels, and wind turbines is demonstrated. Individual freight railcars have different functions except that regenerative brakes are identical for all wheels. Except for different settings for railcar embodiments, voltage regulators are identical. Capacitors are identical. Airfoils and solar panels may vary in size.

Conventional regenerative brakes on passenger trains charge capacitors. Power temporarily stored in passenger trains' capacitors is used for 'hotel amenities' or discharged into the utility grid. Here the regenerative brake capacitors have controlled discharge into battery embodiments. Rooftop airfoils incorporate solar panels.

An exemplary application of high-speed VAWTs is Ishigaki City, Japan where emergency services use wind power generated by Challenergy Incs' VAWTs during typhoon caused power outages. Their ability to operate in extreme conditions makes Challenergy Inc., Center of Garage Room 01, 1-16-3 Yokogawa, Sumida-ku, Japan 130-003, one likely source of wind turbines. The solar-assisted railroad-based wind farm has been assigned to Railroad Wind Farm, LLC, a holding company marketing the technology as a railroad wind farm.

Battery embodiments include boxcars with storage battery banks, EV transport railcars, boxcars with EV batteries or rechargeable batteries, and flatbed railcars with semi-trailer shipping containers. Airfoils on battery shipping containers counter act drag created by wind turbines.

Part numbers are consistently used throughout all figures.

Figure 1:
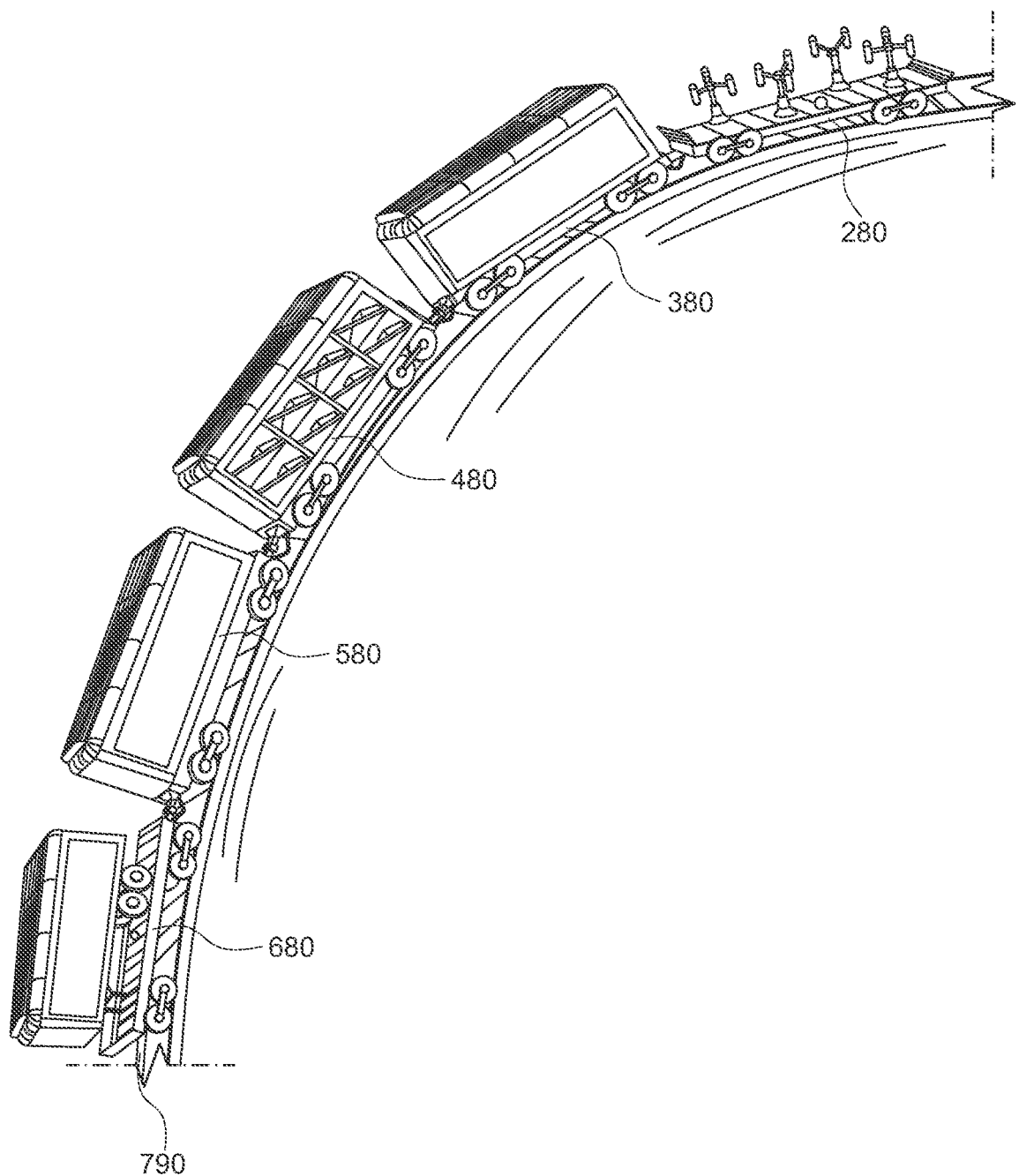
FIG. 1 is a perspective view of a solar-assisted railroad-based wind farm.

FIG. 1 is of railcars 280, 380, 480, 580, 680, comprising one railcar with a plurality of wind turbines and 4 railcar embodiments of battery shipping containers. All embodiments shown in FIGS. 1, 1A, 1B, 1C, function on railroad tracks 790, located in the US, or internationally.

Figure 1A:
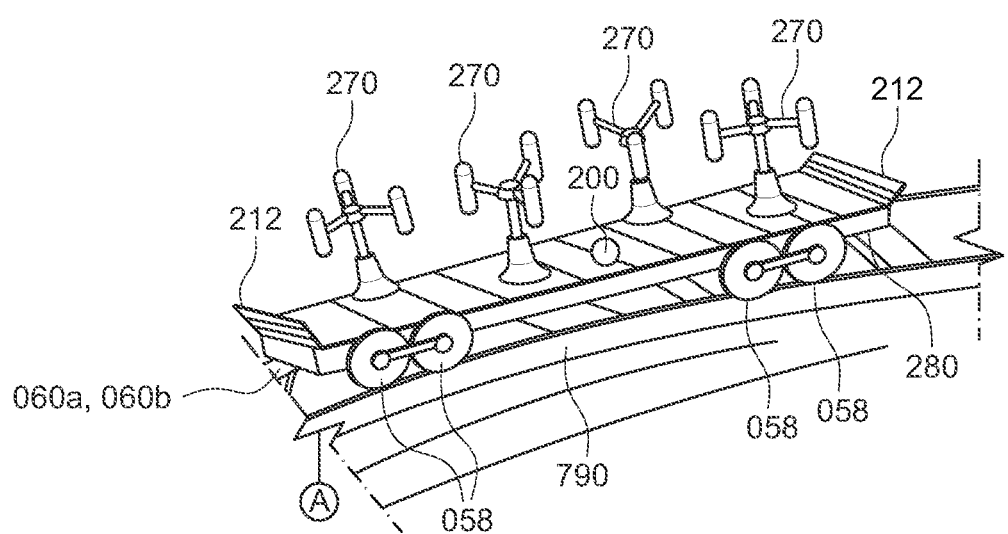
FIG. 1A is a wind turbine railcar.

FIG. 1A shows wind turbine railcars 280, with a plurality of wind turbines 270. Wiring access holes 200, are centered in railcars 280, floors. Wheels 058, are outfitted with regenerative brakes. Regenerative brakes on railcar 280, send power to capacitors (not shown), by wirings 002 (not shown). Wind turbines 270, connect to voltage regulators 090 (not shown), on the underside of railcar by wirings 003 (not shown). VAWTs will require some startup power to 'kickstart' operation. Startup power for wind turbines 270, is optimally provided by train engines, but may come from partially charged battery embodiments if there are no wirings 007 (not shown), to train engines.

As battery embodiments charge, power from regenerative brakes 220 (not shown), is sent to capacitors (not shown), from capacitors (not shown), to storage battery banks voltage regulators (not shown), to storage battery banks (not shown). Wind turbine voltage regulars 090 (not shown), send wind power to next voltage regulators (not shown), by wirings 004 (not shown). Power is diverted to battery embodiments and remaining voltage regulators with their battery embodiments. Additional voltage regulators of modified railcars allow for expansion of the railroad wind farm.

After charging wind turbines 270, voltage regulars 090 (not shown), send wind turbines 270, power to train engines (not shown), by wirings 007 (not shown). Trains' engines (not shown), are in effect put into overdrive by supplemental power from wind turbines 270.

After charging, if no connections to train engines (wirings 007—not shown) exist, railcars 280, voltage regulators 090 (not shown), turn off power generation from wind turbines 270, power from railcars 280, regenerative brakes is sent to capacitors (not shown), by wirings 002 (not shown), to voltage regulators 090 (not shown), by wirings 006 (not shown), to cowls 212, by wirings 008 (not shown).

Shape and location of cowls 212, does not affect their function. Shown fastened to decks of railcars 280, cowls could enhance air flows to provide upward lift for wind turbines 270, suggested embodiments of cowls 212, also include, as solid shapes or logos on sides of shipping containers, as borders around advertising panels on sides of shipping containers, positioned between wheels 058, to act as 'skirts' akin to semis, or one skilled in the art could otherwise locate cowls 212.

Onboard wireless networks 088 (not shown—see FIG. 5), operate if there are no connections to train engines from railroad wind farm embodiments (wirings 007—not shown). Numbers of wind turbines 270, or wind turbine cars 280, can vary without affecting the principles of the invention.

Figure 1B:
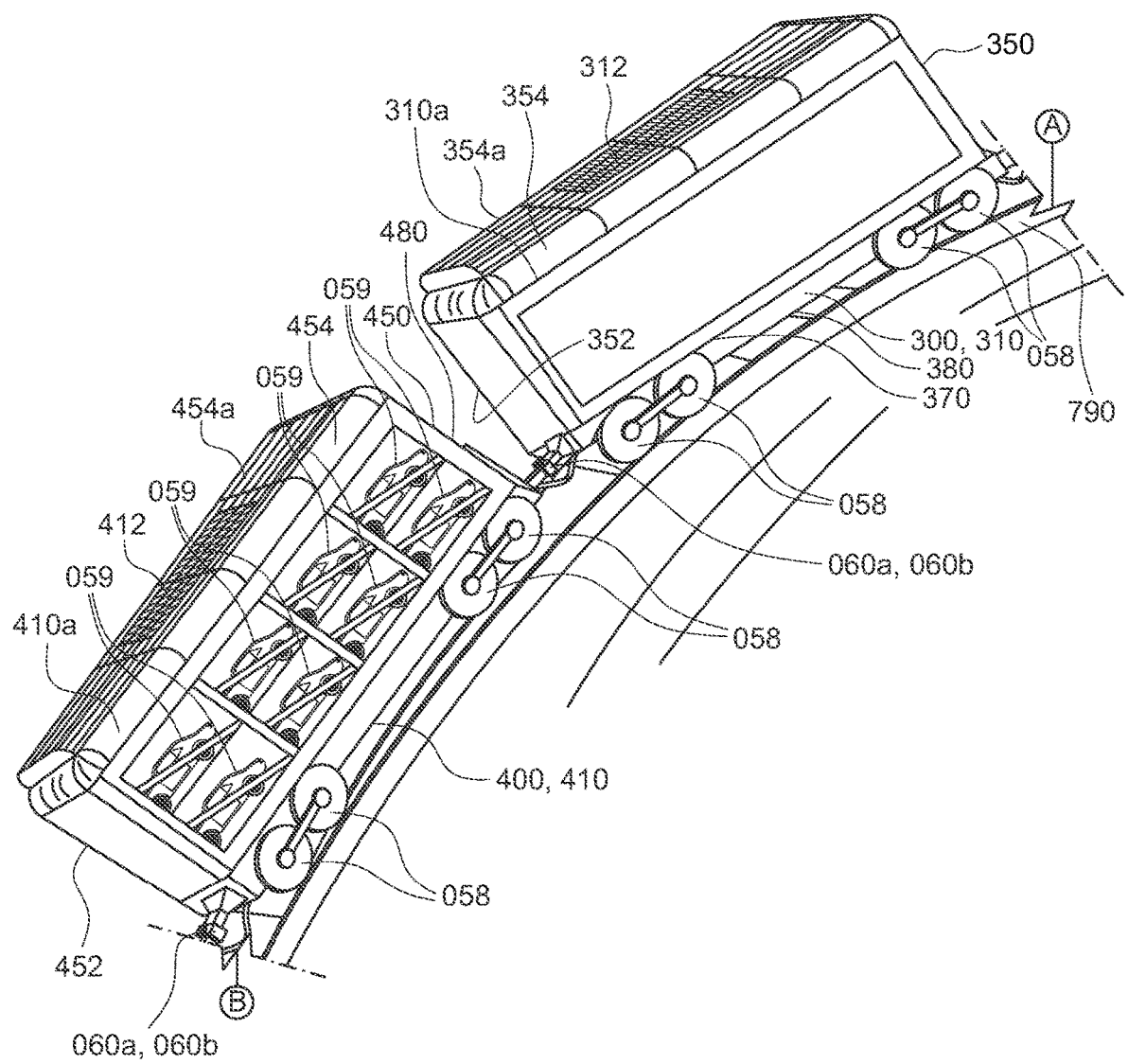
FIG. 1B is a storage battery railcar and Electric Vehicle transport railcar.

FIG. 1B shows the second and third railcars, 380, 480. Railcar 380, is for charging and/or shipping storage battery banks 054 (not shown). Railcar 480, charges and/or ships factory installed batteries 057 (not shown) while transporting EVs 059. Regenerative brakes 320 (not shown), solar panels 354a, and wind turbines 270 (not shown), charge storage battery banks 054 (not shown), by wirings 005 (not shown). Wheels 058, are outfitted with regenerative brakes 320 (not shown). Sides of shipping containers 370, are used for advertising. End airfoils 350, 352, and rooftop airfoils 354, counteract drag from wind turbines 270 (not shown). Rooftop airfoils 354, have solar panels 354a. Wiring access holes 300 (not shown), are installed in center of railcar 380, floors. Temporary wiring access holes 310a (not shown), are installed in rooftop for solar panels 354a, and capacitors 340 (not shown). Temporary wiring access holes 310a (not shown), location determined by installer.

Regenerative brakes 320 (not shown), connect to capacitors 340 (not shown), by wirings 011 (not shown). Capacitors 340 (not shown), connect to voltage regulators 092 (not shown), by wirings 010 (not shown). Solar panels 354a, connect to voltage regulators 092 (not shown), by wirings 009 (not shown). Voltage regulators 092 (not shown), connect to storage battery banks 054 (not shown), by wirings 005 (not shown). Voltage regulators 092 (not shown), connect to voltage regulators 090 (not shown), by wirings 004 (not shown). Voltage regulators 092 (not shown), connect to voltage regulators 094 (not shown), by wirings 013 (not shown). After wirings installation temporary wiring access holes 310a (not shown), are sealed.

After battery embodiments are charged, regenerative braking and solar power is sent forward from voltage regulators 092 (not shown), to voltage regulators 090 (not shown), by wirings 004 (not shown), from voltage regulators 090 (not shown), to train engines (not shown), by wirings 007 (not shown). Train engines (not shown), are in effect put into overdrive.

After battery embodiments are charged, and if no connection (wiring 007—not shown) exist, power from solar panels 354a, is turned off by voltage regulators 092 (not shown), regenerative brakes 320 (not shown), continue to function. Power from regenerative brakes 320 (not shown), is sent to capacitors 340, to voltage regulators 092 (not shown), by wirings 010 (not shown), to cowls 312, by wirings 012 (not shown). Shown incorporated into solar panels 354a, shape and location of cowls 312, does not affect their function. Suggested embodiments of cowls 312, also include; as solid shapes, logos, or borders of advertising panels on shipping containers 370, on decks of railcars 280 (not shown), positioned between wheels 058, to act as 'skirts' akin to semis, or cowls 312, can be otherwise located by one skilled in the art.

The number of storage battery banks 054, or storage battery bank boxcars 380, can vary without affecting the principles of the invention. An internet search yields multiple firms specializing in airfoils, and storage batteries in shipping containers.

The third railcar is for EV transport 480. Regenerative brakes 420 (not shown), solar panels 454a, and wind turbines 270 (not shown), charge factory installed EV batteries 057 (not shown), as EVs 059, are shipped. End airfoils 450, 452, and rooftop airfoils 454, counteract drag from wind turbines 270 (not shown). Rooftop airfoils 454, have built in solar panels 454a. Wheels 058, are outfitted with regenerative brakes 420 (not shown). Wiring access holes 400 (not shown), are installed in center of railcars 480, floors. Wiring access holes 400 (not shown), are aligned with wiring access ports 410 (not shown), installed in center of floor of railcars 480. Temporary wiring access holes 410a (not shown), are made in railcars 480, rooftop to provide wiring access to solar panels 454a, and capacitors 440 (not shown). Temporary wiring access holes 410a (not shown), location to be determined by installer. Regenerative brakes 420 (not shown), connect to capacitors 440 (not shown), by wirings 014 (not shown). Capacitors 440 (not shown), connect to voltage regulators 094 (not shown), by wirings 016 (not shown). Solar panels 454a, connect to voltage regulators 094 (not shown), by wirings 015 (not shown). Voltage regulators 094 (not shown), connect to factory installed EV batteries 057 (not shown), by wirings 017 (not shown). Once wirings installation is complete temporary wiring access holes 410a (not shown), are sealed.

After battery embodiments are charged, power from regenerative brakes 420 (not shown), and solar panels 454a, is sent forward from voltage regulator 094 (not shown), to voltage regulators 092 (not shown), by wirings 013 (not shown), to voltage regulators 090 (not shown), by wirings 004 (not shown), to train engines (not shown), by wirings 007 (not shown). Train engines (not shown), are in effect put into overdrive by supplemental power.

After charging, if no connections exist (wirings 007—not shown), solar panels 454a, are shut off by voltage regulators 094 (not shown), by wirings 015 (not shown), power is diverted from regenerative brakes 420 (not shown), to capacitors 440 (not shown), by wirings 014 (not shown), to voltage regulators 094 (not shown), by wirings 016 (not shown), to cowls 412, by wirings 020 (not shown).

Shown incorporated into solar panels 454a, shape and location of cowls 412, does not affect their function. Suggested embodiments of cowls 412, also include, as solid shapes, logos, or borders on shipping containers 370, borders on railcars 480, on decks of railcars 280 (not shown), positioned between wheels 058, to act as 'skirts' akin to those used on semis, or cowls 412, can be otherwise located by one skilled in the art.

The number of EVs 059, or EV transport railcars 480, can vary without affecting the principles of the invention. An internet search yields multiple firms that manufacture EVs.

Figure 1C:
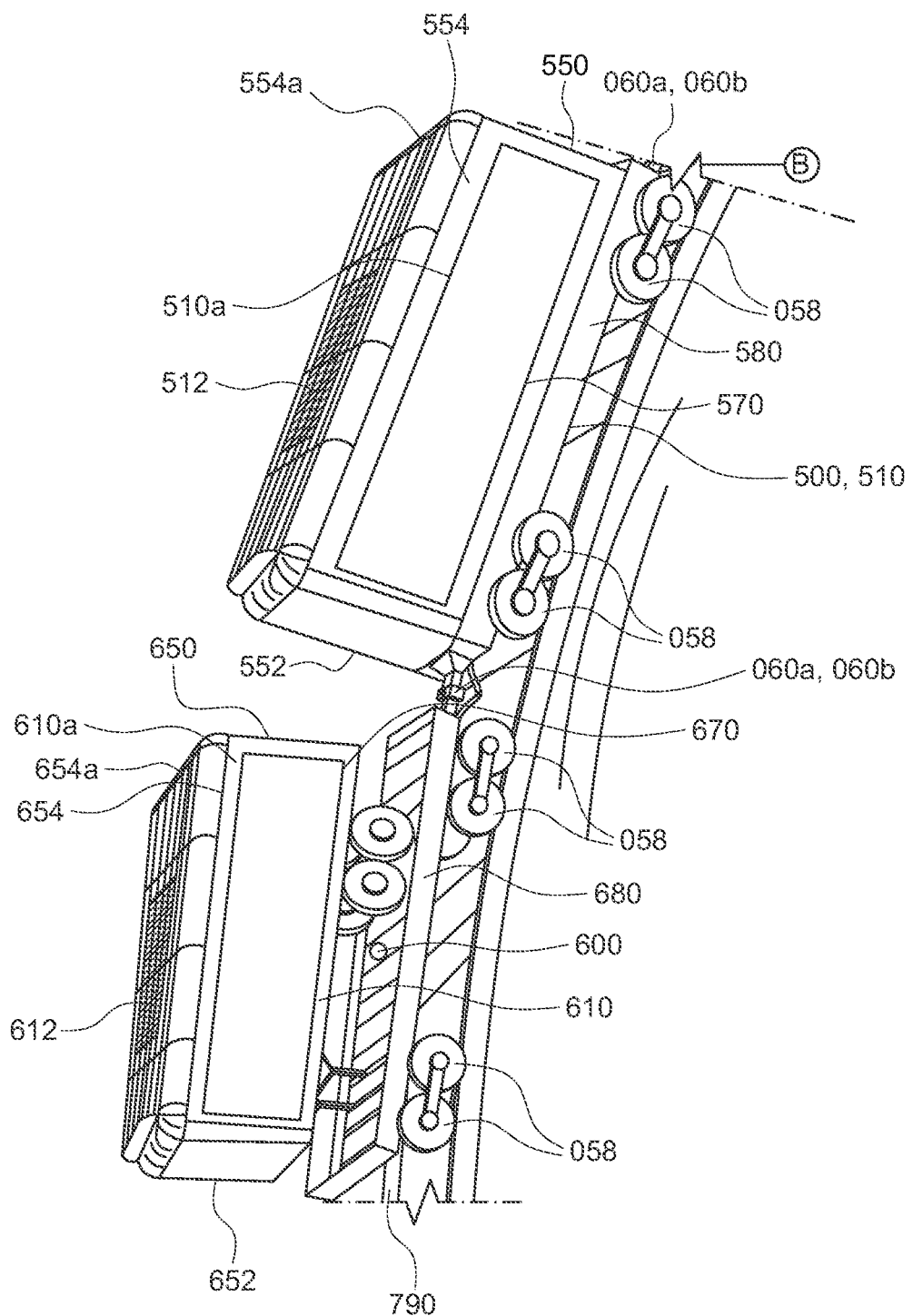
FIG. 1C is an Electric Vehicle battery or rechargeable battery railcar and semi-trailer on flatbed railcar.

FIG. 1C shows the fourth and fifth railcars, 580, 680. Railcars 580, charge and/or transport EV batteries 056 (not shown), and/or rechargeable batteries 055 (not shown). Railcars 680, have semi-trailer shipping containers 670, to charge and/or ship factory installed EV batteries 057 (not shown), and/or EV batteries 056 (not shown), and/or rechargeable batteries 055 (not shown). Regenerative brakes 520 (not shown), solar panels 554a, and wind turbines 270 (not shown), charge EV batteries 056 (not shown), and/or rechargeable batteries 055 (not shown), by wirings 024 (not shown). Wheels 058, are outfitted with regenerative brakes 520 (not shown).

Sides of shipping containers 570, are used for advertising. End airfoils 550, 552, and rooftop airfoils 554, counteract drag from wind turbines 270 (not shown). Rooftop airfoils 554, have solar panels 554a. Wiring access holes 500 (not shown), are installed in center of railcars 580, floors. Temporary wiring access holes 510a (not shown), are installed in the EV battery or rechargeable battery railcars 580, rooftop to provide wiring access to solar panels 554a, and capacitors 540 (not shown). Temporary wiring access holes 510a (not shown), location to be determined by installer.

Regenerative brakes 520 (not shown), connect to capacitors 540 (not shown), by wirings 021 (not shown). Capacitors 540 (not shown), connect to voltage regulators 096 (not shown), by wirings 023 (not shown). Solar panels 554a, connect to voltage regulators 096 (not shown), by wirings 022 (not shown). Voltage regulators 096 (not shown), connect to EV batteries 056 (not shown), and/or rechargeable batteries 055 (not shown), by wirings 024 (not shown). Voltage regulators 096 (not shown), connect to voltage regulators 094 (not shown), by wirings 018 (not shown). Voltage regulators 094 (not shown), connect to voltage regulators 092 (not shown), by wirings 013 (not shown). Voltage regulators 092 (not shown), connect to voltage regulators 090 (not shown), by wirings 004 (not shown), voltage regulators 090 (not shown), connect to train engines (not shown), by wirings 007 (not shown).

Wiring access holes 500 (not shown), centered in floor of railcars 580, are aligned with wiring access ports 510 (not shown), installed in center of shipping containers 570, floor. Regenerative brakes 520 (not shown), connect to capacitors 540 (not shown), by wirings 021 (not shown). Capacitors 540 (not shown), connect to voltage regulators 096 (not shown), by wirings 023 (not shown).

Solar panels 554a, connect to voltage regulators 096 (not shown), by wirings 022 (not shown). Voltage regulators 096 (not shown), connect to EV batteries 056 (not shown), or rechargeable batteries 055 (not shown), by wirings 024 (not shown). Once wirings are installed temporary wiring access holes 510a (not shown), are sealed.

After battery embodiments are charged power is sent forward from voltage regulators 096 (not shown), to factory voltage regulators 094 (not shown), to voltage regulators 092, (not shown), to voltage regulators 090 (not shown), to train engines (not shown). Train engines (not shown), are in effect put into overdrive by supplemental power.

After charging if no connections from railroad wind farm (wirings 007—not shown), exist, power from solar panels 554a, is turned off by voltage regulators 096 (not shown), by wirings 022 (not shown), power from regenerative brakes 520 (not shown), is sent to capacitors 540 (not shown), by wirings 021, to voltage regulators 096 (not shown), by wirings 023 (not shown), to cowls 512, by wirings 026 (not shown). Shown incorporated into solar panels 554a, shape and location of cowls 512, does not affect their function. Suggested embodiments of cowls 512, include, as solid shapes or logos on side of shipping containers 570, as borders of advertising panels on shipping containers 570, on decks of railcars 280 (not shown), positioned between wheels 058, to act as 'skirts' akin to those used on semis, or cowls 512, can be otherwise located by one skilled in the art.

The number EV batteries 056 (not shown), rechargeable batteries 055 (not shown), or railcars 580, can vary without affecting the principles of the invention. An internet search yields multiple companies that specialize in suitable batteries.

The fifth railcar 680, is a flatbed with semi-trailer shipping containers. Regenerative brakes 620 (not shown), solar panels 654a, and wind turbines 270 (not shown), charge factory installed EV batteries 057 (not shown), and/or EV batteries 056 (not shown), and/or rechargeable batteries 055 (not shown), by wirings 030 (not shown). Wheels 058, are outfitted with regenerative brakes 620 (not shown). Sides of semi-trailer shipping containers 670, are used for advertising. End airfoils 650, 652, and rooftop airfoils 654, counteract drag from wind turbines 270 (not shown). Rooftop airfoils 654, have solar panels 654a. Wiring access holes 600, are installed in center of railcars 680, floors. Wiring access ports 610 (not shown), are installed on the underside of semi-trailer shipping containers 670, with location to be determined by installer. Temporary wiring access holes 610a (not shown), are installed in semi-trailer rooftop for solar panels 654a, and capacitors 640 (not shown). Temporary wiring access holes 610a (not shown), location determined by installer.

Regenerative brakes 620 (not shown), connect to capacitors 640 (not shown), by wirings 027 (not shown). Capacitors 640 (not shown), connect to voltage regulators 098 (not shown), by wirings 029 (not shown). Solar panels 654a, connect to voltage regulators 098 (not shown), by wirings 028 (not shown). Voltage regulators 098 (not shown), connect to factory installed EV batteries 057 (not shown), and/or EV batteries 056 (not shown), and/or rechargeable batteries 055 (not shown), by wirings 030 (not shown).

Voltage regulators 098 (not shown), connect to voltage regulators 096 (not shown), by wirings 025 (not shown), to voltage regulators 094 (not shown), by wirings 018 (not shown). Voltage regulators 094 (not shown), connect to voltage regulators 092 (not shown), by wirings 013 (not shown). Voltage regulators 092 (not shown), connect to voltage regulators 090 (not shown), by wirings 004 (not shown), voltage regulators 090 (not shown), connect to train engines (not shown), by wirings 007 (not shown). After wirings installation wiring access holes 610a (not shown), are sealed.

As battery embodiments are charged, voltage regulators 098 (not shown), connect to factory installed EV batteries 057 (not shown), EV batteries 056 (not shown), or rechargeable batteries 055 (not shown), by wirings 030 (not shown). Voltage regulators 098 (not shown), connect to more voltage regulators (not shown), if any, by wirings 32 (not shown).

After battery embodiments are charged, power from regenerative brakes 620 (not shown), and solar panels 654a, is sent from voltage regulators 098 (not shown), to voltage regulators 096 (not shown), to voltage regulators 094, to voltage regulators 092 (not shown), to voltage regulators 090 (not shown),
to train engines 180 (not shown), wirings 007 (not shown). Train engines (not shown), are in effect put into overdrive by supplemental power.

After charging, if no connections (wirings 007—not shown), exist, power from solar panels 654a, is turned off by voltage regulators 098 (not shown), by wirings 028 (not shown). Power from regenerative brakes 620 (not shown), is sent to capacitors 640 (not shown), by wirings 027 (not shown), to voltage regulators 098 (not shown), by wirings 029 (not shown), to cowls 612, by wirings 031 (not shown). Shown incorporated into solar panels 654a, shape and location of cowls 612, does not affect their function. Suggested embodiments of cowls 612, include, as solid shapes or logos on semi-trailer 670, sides, borders of advertising panels on semi-trailer 670, sides, on decks of railcars 280 (not shown), positioned between wheels 058, to act as 'skirts' akin to those used on semis (not shown), or cowls 612, can be otherwise located by one skilled in the art.

The number of semi-trailers 670, or railcars 680, can vary without affecting the principles of the invention. One skilled in the art will appreciate that railcar embodiments can be repeated or rearranged in any order without affecting the principles of the invention. Any improvement or upgrade, even incidental, not specifically outlined is intended to be included within the specifications. An internet search yields multiple semi-trailer shipping firms.

Figure 2:
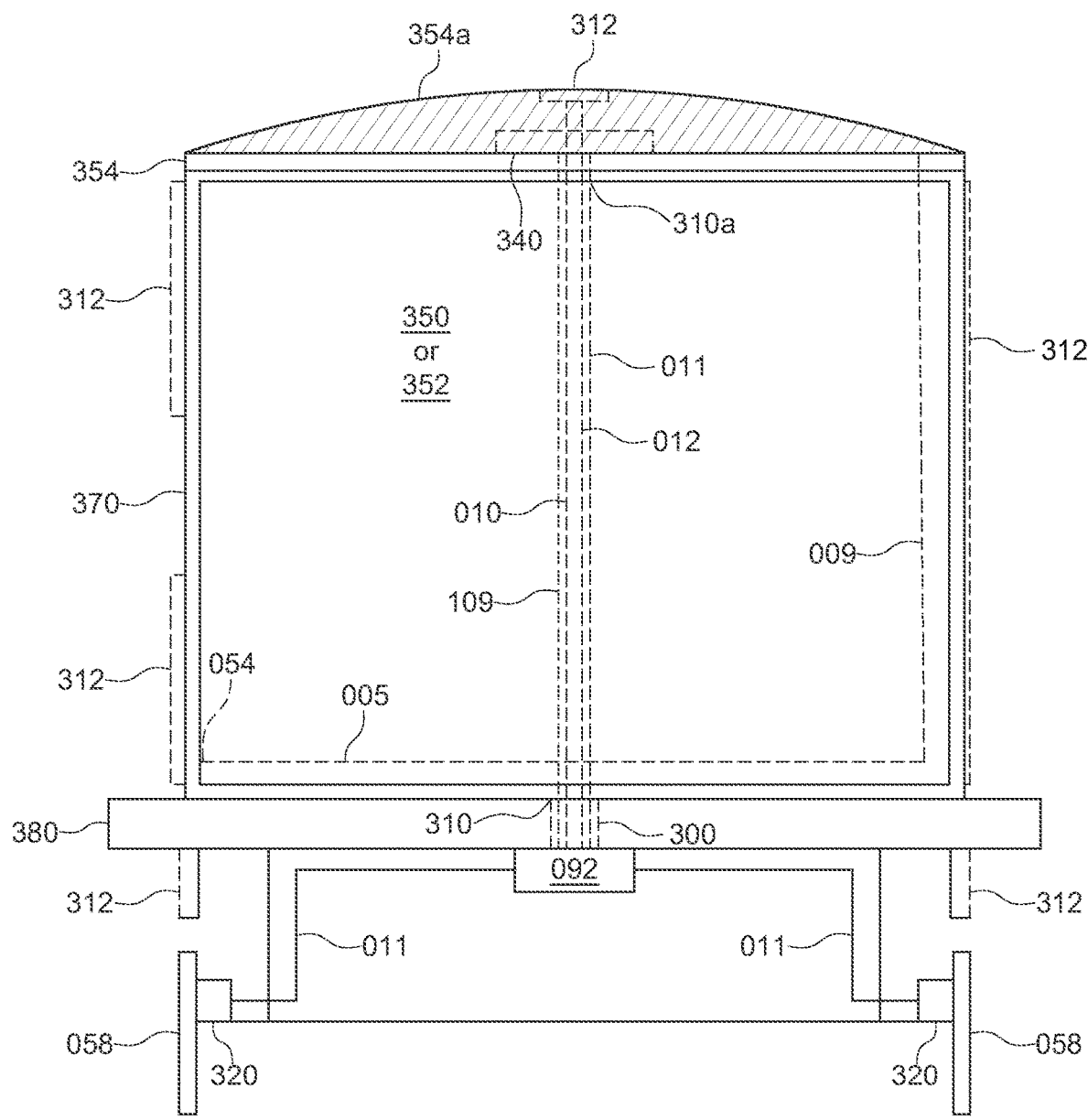
FIG. 2 is an end view of storage battery bank shipping container.

FIG. 2 is an end view of storage battery banks railcars 380. Wheels 058, are outfitted with regenerative brakes 320. Wiring access holes 300, align with wiring access ports 310. End airfoils 350, or 352 (not shown), and rooftop airfoils 354, counter act drag created by wind turbines 270 (not shown—FIG. 1A).

Similar to those used by semis, air foils are of fiberglass or comparable lightweight construction.

Airfoils serve the same function for all shipping containers. Additional airfoils are used as needed on non-railroad wind farm shipping containers to compensate for drag from wind turbines 270 (not shown). Airfoils 354, with built-in solar panels 354a, are installed over capacitors 340. Regenerative brakes 320, connect to capacitors 340, by wirings 011. Capacitors 340, connect to voltage regulators 092, by wirings 010. Solar panels 354a, connect to voltage regulators 092, by wirings 009. Voltage regulators 092, connect to storage batteries 054 (not shown), by wirings 005.

After battery embodiments are charged and if no connections (wirings 007—not shown), exist, voltage regulators 092, cease power generation from solar panels 354a, by wirings 009. Regenerative brakes 320, continue to operate. Power generated by regenerative brakes 320, is sent to capacitors 340, by wirings 011, to voltage regulators 092, by wirings 010, from voltage regulators 092, to cowls 312, by wirings 012. Once wirings are installed temporary wiring access holes 310a, are sealed. Other railcar embodiments' wiring configurations are similar except for differing battery embodiments.

Figure 3:
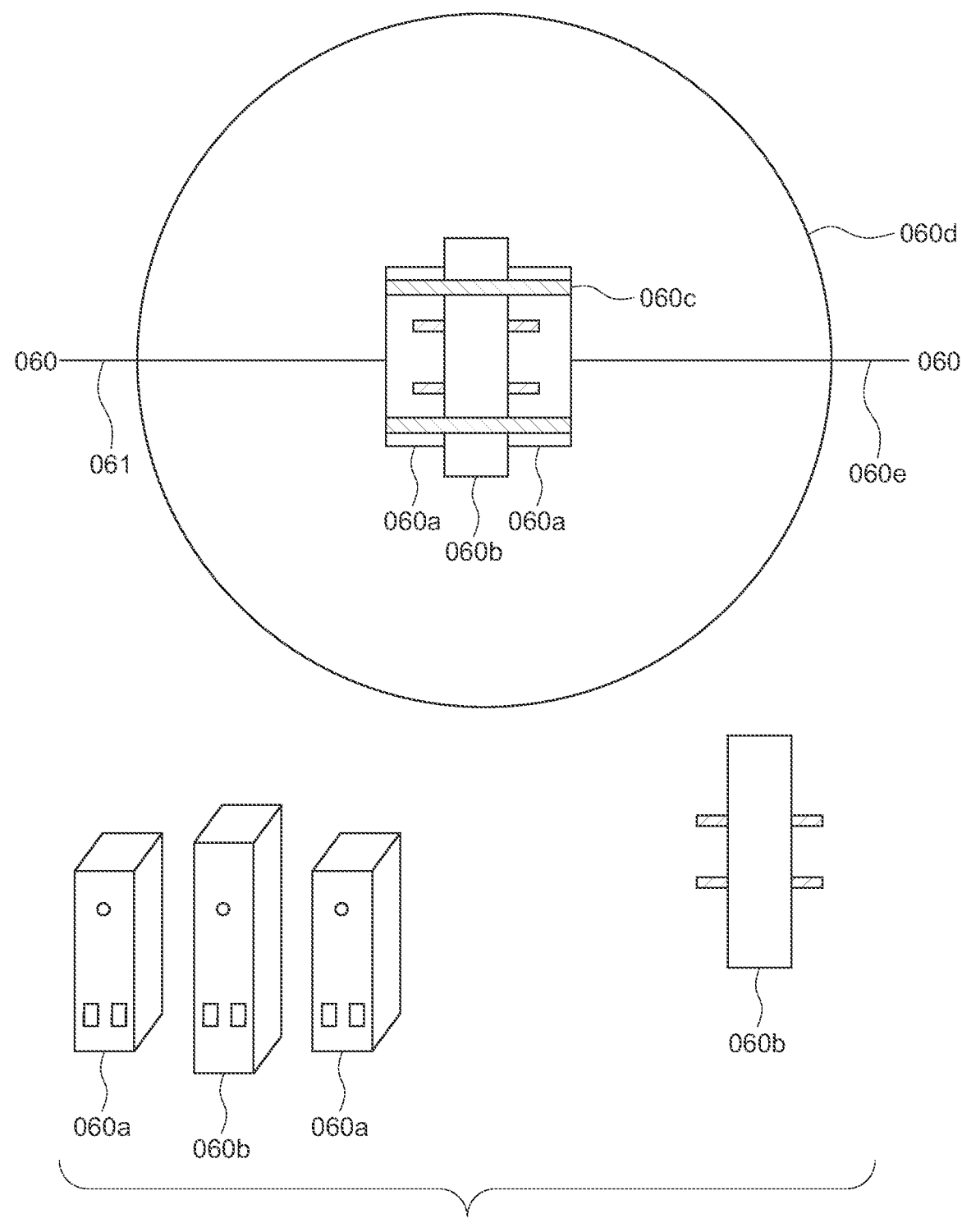
FIG. 3 is a cross sectional view of wiring harness connectors.

FIG. 3. shows a cross sectional view of wiring harness connectors 060a, 060b, 060a, of associated wirings bundled into a wiring harness 060. Associated wirings have protective coverings 060e. An exploded view of connecting plugs 060a, 060b, 060a, is shown with connecting plugs 060b, shown individually.

Wiring harness connections 060a, 060b, 060a, with Velcro connection securing straps 060c, connect railcars to each other. For illustrative purposes, a 3-prong wiring harness connecting plug is shown. Connecting plugs with a plurality of pins like those commonly used for semi-trailers are anticipated.

Wiring harness connections have female end plugs 060a. Female end plugs 060a, plug into double-male plugs 060b. Double-male plugs 060b, plug into female end plugs 060a. Velcro securing straps 060c, or other suitable fasteners, prevent connecting plugs 060a, 060b, 060a, from vibrating loose. Wiring harness 060, connectors 060a, 060b, 060a, have waterproof covers 060d.

Wiring harness 060, can be attached with industrial zip ties 061, or by any method one skilled in the art would deem acceptable. One skilled in the art may use another means of making electrical connections between railcars without affecting the principles of the invention. The number of wiring harness connections 060a, 060b, 060a, can vary without affecting the principles of the invention. Hardware for wiring connections is readily available.

Figure 4:
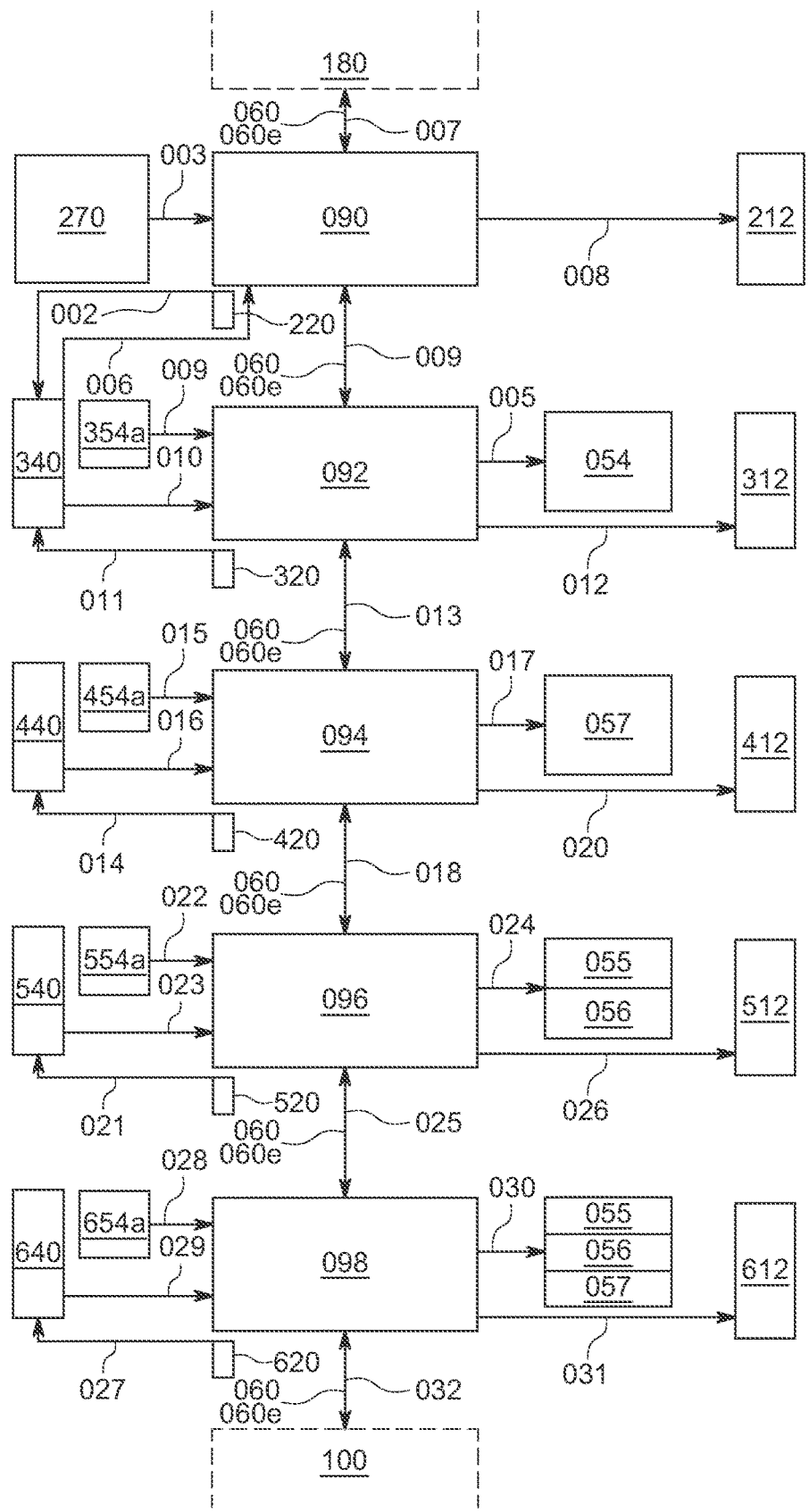
FIG. 4 is a schematic of wiring harness.

FIG. 4 is a schematic of wiring harness 060. A series of voltage regulators charge battery embodiments, then divert power to train engines, or to cowls. Battery embodiments are, storage battery banks 054, rechargeable batteries 055, and/or EV batteries 056, or factory installed EV batteries 057. While battery embodiments are charging, power generated is sent backward to train. Different rates of charge of battery embodiments is expected. Power is diverted by voltage regulators to uncharged battery embodiments as needed. After battery embodiments are charged, voltage regulators divert power generated forward to train engines, or to cowls.

Wiring harness 060, is comprised of voltage regulators, connected to, capacitors, regenerative brakes, solar panels, battery embodiments, and cowls, and to each other with associated wirings. Associated wirings are bundled with protective coverings 060e. Common multi-functional voltage regulators are used in all locations. Voltage regulator embodiments' settings are designated as individual voltage regulators, 090, 092, 094, 096, 098. Identical regenerative brakes are designated as 220, 320, 420, 520, 620. Identical capacitors are designated as 340, 440, 540, 640. Solar panels are designated as 354a, 454a, 554a, 654a. Cowl embodiments are designated as 212, 312, 412, 512, 612.

Voltage regulators 090, connect to voltage regulators 092, by wirings 004, voltage regulators 092, connect to voltage regulators 094, by wirings 013, voltage regulators 094, connect to voltage regulators 096, by wirings 018, voltage regulators 096, connect to voltage regulators 098, by wirings 025. Voltage regulators 098, connect to next voltage regulators 100, if any, by wirings 032.

During charging, voltage regulators 090, inputs are, a plurality of wind turbines 270, connected to voltage regulators 090, by wirings 003, and regenerative brakes 220, power to capacitors 340, to voltage regulators 090, by wirings 006. Voltage regulators 092, inputs are, from voltage regulators 090, by wirings 004, regenerative brakes 320, to capacitors 340, by wirings 011, to voltage regulators 092, by wirings 010, solar panels 354a, to voltage regulators 092, by wirings 009. Voltage regulators 094, inputs are from voltage regulators 092, by wirings 013, regenerative brakes 420, to capacitors 440, by wirings 014, solar panels 454a, to voltage regulators 094, by wirings 015. Voltage regulators 096, inputs are from voltage regulators 094, by wirings 018, regenerative brakes 520, to capacitors 540, by wirings 021, to voltage regulators 096, by wirings 023, solar panels 554*a*, to voltage regulators 096, by wirings 022. Voltage regulators 098, inputs are from voltage regulators 096, by wirings 025, regenerative brakes 620, to capacitors 640, by wirings 027, to voltage regulators 098, by wirings 029, solar panels 654*a*, to voltage regulators 098, by wirings 028.

During charging, Voltage regulators 090, outputs are to voltage regulators 092, by wirings 004. Voltage regulators 092, outputs are to storage battery banks 054, by wirings 005, voltage regulators 092, to voltage regulators 094, by wirings 013. Voltage regulators 094, outputs are to factory installed EV batteries 057, by wirings 017, to voltage regulators 096, by wirings 018. Voltage regulators 096, outputs are to EV batteries 056, or rechargeable batteries 055, by wirings 024, to voltage regulators 098, by wirings 025. Voltage regulators 098, outputs are to factory installed EV batteries 057, and/or EV batteries 056, and/or rechargeable batteries 055, by wirings 030, to voltage regulators 100, if any, by wirings 032.

During charging, voltage regulators 090, throughputs are wind turbines 270, power to voltage regulators 090, by wirings 003, voltage regulators 090, to voltage regulators 092, by wirings 004. Voltage regulators 092, throughputs are, regenerative brakes 220, power to capacitors 340, by wirings 002, from capacitors 340, to voltage regulators 090, by wirings 006, to voltage regulators 092, by wirings 004, to storage battery banks 054, by wirings 005, regenerative brakes 320, to capacitors 340, by wirings 011, to voltage regulators 092, by wirings 010, to storage battery banks 054, by wirings 005, solar panels 354*a*, to voltage regulators 092, by wirings 009, to storage battery banks 054, by wirings 005. Voltage regulators 094, throughputs are, regenerative brakes 420, to capacitors 440, by wirings 014, from capacitors 440, to voltage regulators 094, by wirings 016, to factory installed EV batteries 057, by wirings 017, solar panels 454*a*, to voltage regulators 094, by wirings 015, to voltage regulators 096, by wirings 018. Voltage regulators 096, throughputs are, regenerative brakes 520, to capacitors 540, by wirings 021, from capacitors 540, to voltage regulators 096, by wirings 023, to EV batteries 056, or rechargeable batteries 055, by wirings 024, solar panels 554*a*, to voltage regulators 096, by wirings 022, to EV batteries 056, or rechargeable batteries 055, by wirings 024, to voltage regulators 098, by wirings 025. Voltage regulators 098, throughputs are, regenerative brakes 620, to capacitors 640, by wirings 027, from capacitors 640, to voltage regulators 098, by wirings 029, to EV factory installed batteries 057, EV batteries 056, or rechargeable batteries 055, by wirings 030, solar panels 654*a*, to voltage regulators 098, by wirings 028, to EV factory installed batteries 057, EV batteries 056, or rechargeable batteries 055, by wirings 030, to voltage regulators 100, if any, by wirings 032.

After battery embodiments are charged; power is sent from voltage regulators 098, to voltage regulators 096, by wirings 025, to voltage regulators 094, by wirings 018, to voltage regulators 092, by wirings 013, to voltage regulators 090, by wirings 004, to train engines 180, by wirings 007, or if no wirings 007, to cowls.

If no connections (wirings 007), exist, regenerative brakes continue to operate. Solar panels 354*a*, are shut off by voltage regulators 092, by wirings 009. Solar panels 454*a*, are shut off by voltage regulators 094, by wirings 015. Solar panels 554*a*, are shut off by voltage regulators 096, by wirings 022. Solar panels 654*a*, are shut off by voltage regulators 098, by wirings 028. Wind turbines 270, are shut off by voltage regulators 090, by wirings 003.

After charging, and if no connections (wirings 007), exist, voltage regulator 090 inputs are, from regenerative brakes 220, to capacitors 340, by wirings 002, to voltage regulators 090, by wirings 006. Voltage regulators 092 inputs are, from regenerative brakes 320, to capacitors 340, by wirings 011, to voltage regulators 092, by wirings 010. Voltage regulators 094, inputs are, from regenerative brakes 420, to capacitors 440, by wirings 014, to voltage regulators 094, by wirings 016. Voltage regulators 096, inputs are, from regenerative brakes 520, to capacitors 540, by wirings 021, to voltage regulators 096, by wirings 023. Voltage regulators 098, inputs are, from regenerative brakes 620, to capacitors 640, by wirings 027, to voltage regulators 098, by wirings 029.

Excess power from regenerative brakes 220, 320, 420, 520, 620, is dissipated as heat by cowls 212, 312, 412, 512, 612. Voltage regulators 090, divert power to cowls 212, by wirings 008. Voltage regulators 092, divert power to cowls 312, by wirings 012. Voltage regulators 094, divert power to cowls 412, by wirings 412. Voltage regulators 096, divert power to cowls 512, by wirings 026. Voltage regulators 098, divert power to cowls 612, by wirings 031.

The number of batteries, capacitors, cowls, regenerative brakes, solar panels, voltage regulators, wind turbines, and associated wirings may vary without affecting the principles of the invention. Schematic for voltage regulators 090, shows embodiment that powers train engines without battery embodiments.

For this embodiment capacitors 340, are located on wind turbine railcars 280 (not shown).

Figure 5:
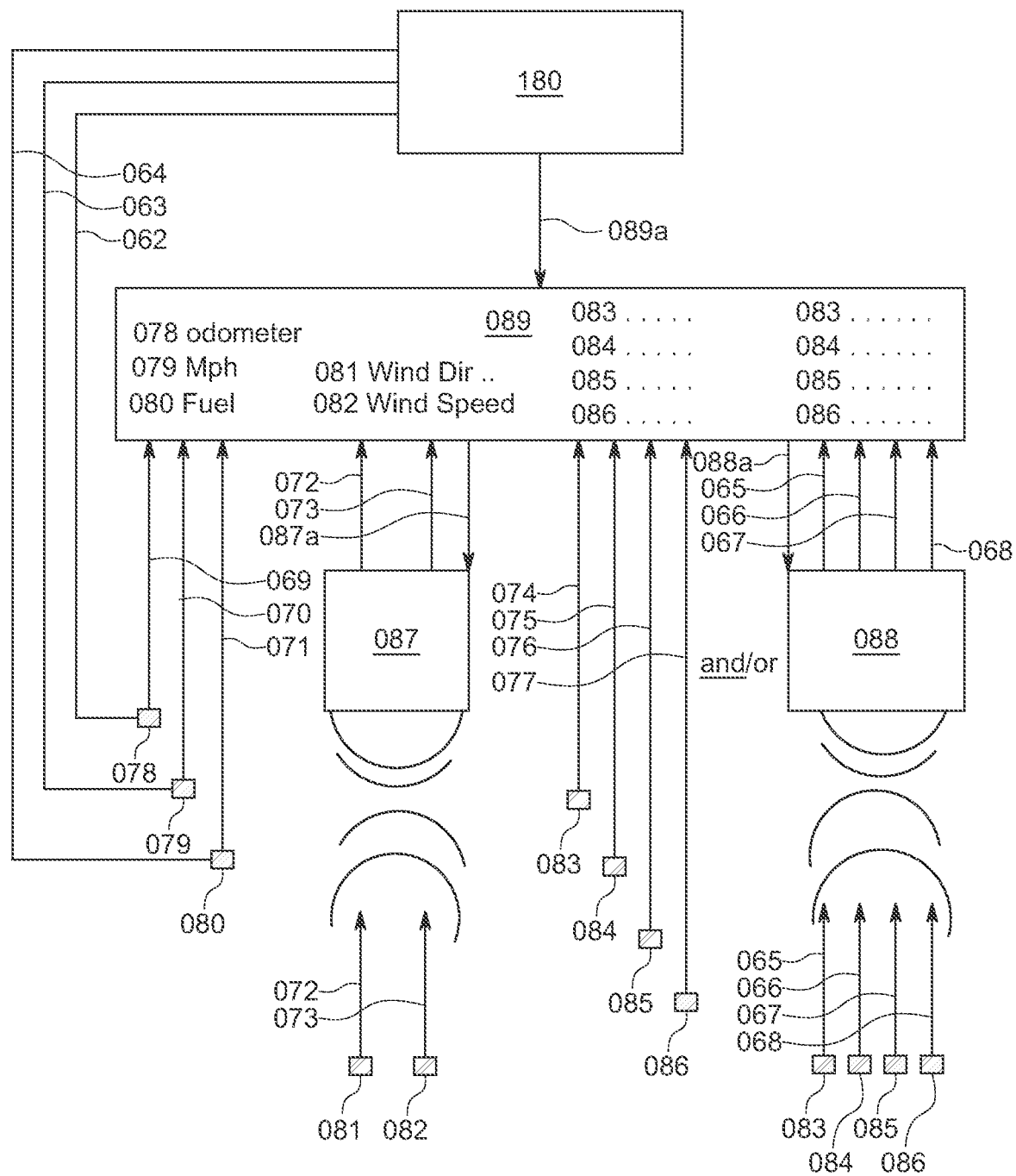
FIG. 5 is a schematic of monitoring system.

FIG. 5 is a schematic of data displays 089. Data displays 089, are easily read by railroad engineers to monitor embodiment performance. Light Emitting Diodes (LEDs), show readouts from sensors.

Data displays 089, receive power from train engines 180, by wirings 089*a*. Data displays 089, connect to sensors for; odometer 078, speedometer 079, fuel gauge 080, wind speed 081, wind direction 082, state of charge of batteries 083, power generated by regenerative brakes 084, power generated by solar panels 085, power generated by wind turbines 086. A log of operational data is created from data obtained by sensors 078, 079, 080, 081, 082, 083, 084, 085, 086.

Sensors 078, connect to engine instrument panel by wirings 062. Sensors 078, connect to data displays 089, by wirings 069. Sensors 079, connect to engine instrument panel by wirings 063. Sensors 079, connect to data displays 089, by wirings 070. Sensors 080, connect engine instrument panel, by wirings 064. Sensors 080, connect to data displays 089, by wirings 071.

National Weather Service wireless networks 087, connect to data displays 089, by wirings 087*a*. Sensors 081, connect to National Weather Service wireless networks 087, by wireless connections 072, sensors 082, connect to National Weather Service wireless networks 087, by wireless connections 073.

Sensors 083, connect to data displays 089, by wirings 074, sensors 084, connect to data displays 089, by wirings 075, sensors 085, connect to data displays 089, by wirings 076, sensors 086, connect to data displays 089, by wirings 077.

Railroad wind farm embodiments generally connect to train engines 180. If not, to keep data displays 089, functional, embodiments require installation of onboard wireless networks 088. Onboard wireless networks 088, connect to data displays 089, by wirings 088*a*. Onboard wireless networks 088, connect to sensors 083, by wireless connections 065, onboard wireless networks 088, connect to sensors 084, by wireless connections 066, onboard wireless networks 088, connect to sensors 085, by wireless connections 067, onboard wireless networks 088, connect to sensors 086, by wireless connections 068.

Data displays 089, embodiments may vary and not affect the principles of the invention. Any alteration or improvement on data displays 089, is within the principles of the invention.

Operation

The embodiments outlined are with, and without, connections to train engines. The main functions are shipping and/or charging of battery embodiments and helping to power the train, or when not connected to train engines, shipping and/or charging of battery embodiments only. Modular railcar embodiments enable shippers and/or railroads to use embodiments in a mix and match fashion without affecting the principles of the invention. One embodiment without batteries powers the train.

When battery embodiments are charged, or not used, power is diverted to train engines to let their diesel-electric turbines to operate at lower revolutions per minute. Lower rpms improve fuel efficiency while reducing wear and maintenance of train engines.

When batteries embodiments are charged while disconnected from train engines, solar and wind power generation is shut off and regenerative brakes remain in effect. Excess power from regenerative brakes is diverted to cowls to be dissipated as heat. One cowl embodiment on a plurality of railcars may save fuel when used between wheels, like a semi-truck 'skirt'.

REFERENCE NUMERALS—PARTS LIST

- 002—wirings from wind turbine railcar regenerative brakes to storage battery boxcar capacitors
- 003—wirings from wind turbines to wind turbine voltage regulators
- 004—wirings from wind turbines voltage regulators to storage battery bank voltage regulators
- 005—wirings from storage battery banks voltage regulators to storage battery banks
- 006—wirings from storage banks capacitors to wind turbine voltage regulators
- 007—wirings from wind turbines voltage regulators to train engines
- 008—wirings from wind turbines voltage regulators to cowls
- 009—wirings from storage battery banks solar panels to storage battery banks voltage regulators
- 010—wirings from storage battery banks capacitors to storage battery banks voltage regulators
- 011—wirings from storage battery banks regenerative brakes to storage battery banks capacitors
- 012—wirings from storage battery banks voltage regulators to storage battery banks cowls
- 013—wirings from storage battery banks voltage regulators to EV transport voltage regulators
- 014—wirings from EV transport regenerative brakes to EV transport capacitors
- 015—wirings from EV transport solar panels to EV transport voltage regulators
- 016—wirings from EV transport capacitors to EV transport voltage regulators
- 017—wirings from EV transport voltage regulators to factory installed EV batteries
- 018—wirings from EV transport voltage regulators to EV or rechargeable batteries voltage regulators
- 020—wirings from EV transport voltage regulators to cowls
- 021—wirings from EV or rechargeable battery railcars regenerative brakes to capacitors
- 022—wirings from EV battery or rechargeable battery solar panels to voltage regulators
- 023—wirings from EV battery, or rechargeable battery capacitors to voltage regulators
- 024—wirings from EV or rechargeable battery voltage regulators to EV, or rechargeable batteries
- 025—wirings from EV or rechargeable battery voltage regulators to semi-trailer voltage regulators
- 026—wirings from EV battery or rechargeable battery voltage regulators to cowls
- 027—wirings from flatbed railcars with semi-trailers regenerative brakes to capacitors
- 028—wirings from flatbed railcars with semi-trailers solar panels to voltage regulators
- 029—wirings from flatbed railcars with semi-trailers capacitors to voltage regulators
- 030—wirings from semi-trailer voltage regulators to factory installed EV batteries, EV batteries, or
  a. rechargeable batteries
- 031—wirings from semi-trailers voltage regulators to cowls
- 032—wirings from semi-trailer voltage regulators to rest of train
- 054—storage battery banks
- 055—rechargeable battery
- 056—EV Battery
- 057—factory installed EV battery
- 058—railcar wheel
- 059—Electric Vehicle
- 060—wiring harness
- 060a—wiring harness female connector
- 060b—wiring harness double male connector
- 060c—wiring harness Velcro straps for connectors
- 060d—wiring harness waterproof cover for connectors
- 060e—wiring harness protective cover
- 061—industrial zip ties
- 062—wirings from train instrument panel to odometer sensor
- 063—wirings from train instrument panel to speedometer sensor
- 064—wirings from train instrument panel to fuel gauge sensor
- 065—wireless connection for state of charge of batteries sensor
- 066—wireless connection for power generated by regenerative brakes sensor
- 067—wireless connection for power generated by solar panels sensor
- 068—wireless connection for power generated by wind turbines sensor
- 069—wirings from odometer sensor to data displays
- 070—wirings from speedometer sensor to data displays
- 071—wirings from fuel gauge sensor to data displays
- 072—wireless connection for wind speed sensor to data displays
- 073—wireless connection for wind direction sensor to data displays
- 074—wirings to data displays from state of charge of batteries sensor
- 075—wirings to data displays from power generated by regenerative brakes sensor
- 076—wirings to data displays from power generated by solar panels sensor 077—wirings to data display from power generated by wind turbines sensor
078—odometer sensor
079—speedometer sensor
080—fuel gauge sensor
081—wind speed sensor
082—wind direction sensor
083—state of charge of batteries sensor
084—power generated by regenerative brakes sensor
085—power generated by solar panels sensor
086—power generated by wind turbines sensor
087—National Weather Service wireless networks
087a—wirings from data displays to National Weather Service wireless networks
088—onboard wireless networks
088a—wirings from data displays to onboard wireless networks
089—data displays
089a—wirings from train engines to data displays
090—voltage regulators set for flatbed railcars with wind turbines
092—voltage regulators set for boxcars with storage battery banks
094—voltage regulators set for EV transport railcars
096—voltage regulators set for boxcars with EV batteries and/or rechargeable batteries
098—voltage regulators set for flatbed railcars with semi-trailer shipping containers
100—voltage regulators of any additional railcars
180—train engines
200—wiring access holes for wind turbine railcars
212—cowls for wind turbine railcars
220—regenerative brakes for wind turbines railcars
270—wind turbines
280—flatbed railcars with wind turbines
300—wiring access holes of storage battery banks boxcars
310—wiring access ports in floor of storage battery banks boxcars
310a—temporary wiring access holes in roof of storage battery banks boxcars
312—cowls for boxcars with storage battery banks
320—regenerative brakes for storage battery banks boxcars
340—capacitor for storage battery banks boxcars
350—end airfoils for storage battery banks boxcars
352—end airfoils for storage battery banks boxcars
354—rooftop airfoils for storage battery banks boxcars
354a—solar panels for storage battery banks boxcars
370—shipping containers for storage battery banks boxcars
380—storage battery banks boxcars
400—wiring access holes for EV transport cars
410—wiring access ports in floor of EV transport cars
410a—temporary wiring access holes in roof of EV transport cars
412—cowls for EV transport cars
420—regenerative brakes for EV transport cars
440—capacitors for EV transport cars
450—end airfoils for EV transport cars
452—end airfoils for EV transport cars
454—rooftop airfoils for EV transport cars
454a—solar panels for EV transport cars
480—EV transport cars
500—wiring access holes for EV batteries or rechargeable batteries boxcars
510—wiring access ports in floor of EV batteries or rechargeable batteries boxcars shipping containers
510a—temporary wiring access holes in roof of EV batteries or rechargeable batteries shipping
b. containers
512—cowls for EV batteries or rechargeable batteries boxcars
520—regenerative brakes for EV batteries or rechargeable batteries boxcars
540—capacitors for EV batteries or rechargeable batteries boxcars
550—end airfoils for EV batteries or rechargeable batteries boxcars
552—end airfoils for EV batteries or rechargeable batteries boxcars
554—rooftop airfoils for EV batteries or rechargeable batteries boxcars
554a—solar panels for EV batteries or rechargeable batteries boxcars
570—EV batteries or rechargeable batteries shipping containers
580—boxcars with EV batteries or rechargeable batteries
600—wiring access holes for semi-trailer railcars
610—wiring access ports in floor of semi-trailers
610a—temporary wiring access holes in roof of semi-trailers shipping containers
612—cowls for railcars with semi-trailers
620—regenerative brakes for semi-trailer railcars
640—capacitors for semi-trailer railcars
650—end airfoils for semi-trailer railcars
652—end airfoils for semi-trailer railcars
654—rooftop airfoils for semi-trailer railcars
654a—solar panels for semi-trailer railcars
670—semi-trailer shipping containers
680—railcars with semi-trailer shipping containers
790—railroad tracks

CONCLUSIONS

The technology described is a railroad wind farm. Railroad wind farm turbines are not dependent on naturally occurring wind making them fundamentally different than conventional wind turbines. A railroad wind farm features a combination of kinetic, solar, and wind energies employed to charge battery embodiments. The railroad wind farm is an innovative application of VAWTs originally developed for typhoons. Here VAWTs are mounted on flatbed railcars resulting in the ability to charge and/or ship batteries by rail. Regenerative brakes are adapted to freight railcars along with a new application for solar panels. Main functions of the railroad wind farm are, replacing hazardous transmission lines for existing utilities, avoiding construction of new transmission lines for solar or wind farms, supplying EV infrastructure, and providing supplemental power to train engines. Provisions are made for railroad wind farms not connected to train engines. Data displays monitor embodiment functions with, or without, connections.

Embodiments described solve the problem of hazardous transmission lines. Existing utilities can significantly reduce liabilities due to deadly transmission lines and prevent loss of income caused by self-imposed power outages. Replacement of existing transmission lines frequently causing deadly wildfires and avoiding new ones make the railroad wind farm a considerably safer option.

Embodiments described avoid the problems resulting from renewable energy sources building new transmission lines. Shipping power by rail allows the remote location of new renewable energy power plants. Remote locations enable easier siting resulting in wider use of renewable energy and more fossil fuel power plants being decommissioned.

Railroads becoming the link between renewable energy sources and the grid will be profitable. Railroads profit from new income due to shipping storage batteries and increased revenue from shipping of solar and wind farm parts. Embodiments also decrease brake and engine maintenance costs for railroads.

The railroad wind farm gives society a way to transition to lower carbon emissions. Fossil fuel usage is limited to train engines and lubrication. Smaller carbon footprints of EVs, existing utilities, railroads, and renewable energy, help restore the environment. Employment opportunities arising from technologies to reduce global warming are meaningful to individual members of society. In turn, society gains from a stable employed workforce.

RAMIFICATIONS

Summarized here are the far-reaching consequences of the embodiments affecting business, environment, and society. Financial impacts are to existing and renewable energy utilities, the EV industry, and railroads. Fossil fueled utilities using storage battery banks shipped by rail to replace existing hazardous transmission lines could significantly lower their liabilities while preventing costly self-imposed power outages that adversely affect thousands. The ability to replace dangerous transmission lines will have a significant impact on the multi-billion dollar utilities sector.

Shipping energy by rail avoids building new transmission lines which enables remote locations of solar or wind farms. Remote locations of solar or wind farms makes siting less costly. Avoiding construction of new transmission lines for renewable energy projects will impact the $200 billion US renewable energy market, and over $900 billion global market.

The railroad wind farm significantly affects the EV market. The technology provides low cost battery infrastructure to the EV industry. Use of lower cost EV batteries will revolutionize the EV industry by enabling mass production of economical EVs, battery exchanges services by specialty EV franchises that have plug ins for fast charging EV batteries, and hybrid gas EV service stations. Use of embodiments to charge factory installed EV batteries with renewable energy means EV manufacturers can cut EVs purchase price. The EV industry will benefit from increased sales due to lower prices. More EVs on the road make battery exchange services financially viable. Battery exchange services with fast charging plug ins make EV driving convenient. Hybrid gas electric service stations thrive from drivers transitioning to EVs without sacrificing prime locations. Use of semi-trailer shipping containers provides economical over the road shipment of EVs, or other battery embodiments. Estimates differ but financial analysts agree the EV market is in the hundreds of billions.

Utilities shipping conventional and renewable energy by rail is advantageous to railroads. When battery embodiments are charged, or not used, additional power is available for train engines. Additional power for train engines saves fuel, increases train engines' service time, and decreases maintenance costs. Regenerative brakes increase the lifespan of conventional brakes which also decreases maintenance costs. Avoiding the need for transmission lines allows new solar or wind farms to be remotely located. Use of remote locations means more shipping of solar and wind farm parts by rail. Railroads are likely to benefit from building switching yards to exchange storage battery banks. Profits for railroads increase from new markets created for shipping EVs, renewable energies, and parts for solar and wind farms. Railroads potentially gain from heated or cooled railcar embodiments. With a freight rail network of nearly 140,000 route miles the US is the biggest market. Increased shipping of solar and wind farm parts, storage batteries for utilities or renewable energies, new markets for shipping EVs, and construction of new switching yards, are expected impacts on the $80 billion railroad shipping industry. In addition, it is possible to use the technology on thousands of miles of existing railroad tracks around the world.

Substantial environmental impacts such as safer energy production, wildlands conservation, and the promotion of renewable energies result from embodiments. Railroad wind farm technology averts deadly and environmentally devastating wildfires by replacing existing hazardous transmission lines with storage battery banks shipped by rail. Wild lands are not impacted by building new transmission lines. The important goal of reducing carbon emissions is achieved by more renewable energy sources causing decommissioning of fossil fuel power plants. Mainly due to reduced carbon emissions the overall impact of the railroad wind farm to the environment is immeasurable.

The social impact of the technology cannot be calculated. Local and global communities gain from a technological solution to the global warming caused climate change that currently kills 150,000 people per year. Power from renewable energy facilities can be provided at a lower cost to communities seeking to reduce their carbon footprints. Local communities' economies realize increased employment opportunities resulting from their efforts to reduce carbon footprints. Individual people gain financially from the technological means to counter act devastating climate change. Higher employment rates result in more stable communities.

SCOPE

While the above description specifically outlines embodiments, these should not be construed as limitations on the scope, but rather an illustration of possible embodiments. Many other variations are possible, for example, in addition to the advantages of self-created wind, replacement of hazardous transmission lines, and avoiding construction of new transmission lines, freight cars needing electrical power such as refrigerated boxcars, refrigerated semi-trailer shipping containers, heated boxcars or semi-trailers, are possible embodiments. Heated or cooled embodiments interest shippers needing heat or refrigeration for their goods. Speed and light triggered lighting for advertising could light up when embodiments slow to enter a city at night. When ran without battery embodiments, wind turbines can provide power directly to train engines.

Storage battery banks can replace hazardous transmission lines without use of wind turbines. However, without wind turbines the railroad wind farm would more accurately be called a railroad solar farm and any battery charging would be slower.

Other piecemeal options include, without regenerative brakes, and/or solar panels. Regardless of which embodiments are used shippers and/or railroads can mix and match embodiments to best suit their needs. Provisions are made for embodiments not connected to train engines.

Embodiments are scalable. Various sizes can be used on one train, or thousands of trains, and with existing railroad tracks expansion to global markets is inevitable.

Several variations of cowls are contemplated. Possible locations of cowls include, on the deck of wind turbine railcars, shaped into airfoils to improve airflow to wind turbines, as solid shapes or logos, or borders around advertising displays, or as 'skirts' akin to semi-trucks. Or cowls may be otherwise located by one skilled in the art.

Glossary

Advertising space—solid sides of shipping containers
Airfoils—lightweight additions to reduce drag located on ends and tops of shipping containers
Battery embodiments—storage battery banks, factory EV batteries, EV, or rechargeable batteries
Capacitor—energy storage device, same as super capacitor
Climate change—result of global warming
Data display—shows status of railroad wind farm embodiments
Electric Vehicle—EV
EV transport railcar—EV shipping container
Global warming—temperatures rising worldwide from greenhouse-effect causing gasses
National Weather Service Wireless networks—wireless connections to wind data for data display
Onboard wireless network—wireless connections to data display sensors not connected to train engines
Power—electrical power
Railroad wind farm—solar-assisted railroad-based wind farm
Regenerative brake—reverse electric motor that generates power from deceleration
Semi-trailer shipping container—semi-trailer shipping container with airfoils
Sensors—devices to monitor the railroad wind farms' functions
Solar-assisted railroad-based wind farm—railroad wind farm, charging and/or shipping battery embodiments with alternative energies, producer of extra power to train engines
Storage battery banks—storage battery bank shipping container
Solar panels—devices to generate electrical power from sunlight
Train engines—diesel powered turbines that generate power for electric motors to propel trains, location of train engineers, locomotive engine
Transmission lines—powerlines from conventional or renewable utilities
Voltage regulator—device to control electrical power
Wind turbine—device to generate electrical power from wind
Wiring access hole—access for wiring harness, wiring access port
Wiring access port—access for wiring harness, wiring access hole
Wiring harness—electronic components with bundled associated wirings

The invention claimed is:

1. A series of railroad cars, comprising:
one or more regenerative brakes installed on one or more of the wheels of the railroad cars;
a voltage regulator operatively connected to one or more regenerative brakes;
and a wiring access hole installed on the bed of each railcar;
one or more wiring harness connections, chosen from;
female end plugs, double-male adapters between female end plugs, hook and loop straps, and waterproof covers on wiring harness connections,
one or more vertical axis wind turbines installed on a flatbed railroad car;
at least one shipping container railroad car with rechargeable batteries in a rack;
wherein at least one shipping container comprises end airfoils and rooftop airfoils;
wherein at least one shipping container comprises at one solar panel between end airfoils.

2. A railroad car in a series of railroad cars of claim 1 comprising:
one or more semi-trailer shipping containers.

3. A railroad car according to claim 1, wherein said one or more wind turbines are connected to and power the diesel-electric engines.

* * * * *